US008646088B2

(12) United States Patent
Pistoia et al.

(10) Patent No.: US 8,646,088 B2
(45) Date of Patent: Feb. 4, 2014

(54) RUNTIME ENFORCEMENT OF SECURITY CHECKS

(75) Inventors: Marco Pistoia, Amawalk, NY (US);
Omer Tripp, Har-Adar (IL); Martin Vechev, Yorktown Heights, NY (US);
Eran Yahav, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 292 days.

(21) Appl. No.: 12/983,407

(22) Filed: Jan. 3, 2011

(65) Prior Publication Data

US 2012/0174229 A1 Jul. 5, 2012

(51) Int. Cl.
*G06F 21/00* (2013.01)
(52) U.S. Cl.
USPC .............................................. 726/25; 726/22
(58) Field of Classification Search
USPC ......................................................... 726/25
See application file for complete search history.

(56) References Cited

U.S. PATENT DOCUMENTS

| | | | |
|---|---|---|---|
| 8,225,402 B1* | 7/2012 | Averbuch et al. ................ | 726/23 |
| 2007/0074169 A1* | 3/2007 | Chess et al. .................... | 717/126 |
| 2007/0074188 A1* | 3/2007 | Huang et al. ................... | 717/141 |
| 2008/0313648 A1* | 12/2008 | Wang et al. ..................... | 719/315 |
| 2009/0007223 A1 | 1/2009 | Centonze et al. ................ | 726/1 |
| 2009/0094585 A1 | 4/2009 | Choi et al. ...................... | 717/131 |
| 2009/0193497 A1* | 7/2009 | Kikuchi et al. ................... | 726/1 |
| 2009/0288167 A1 | 11/2009 | Freericks et al. ................ | 726/23 |
| 2010/0251371 A1* | 9/2010 | Brown ............................ | 726/23 |
| 2010/0325620 A1* | 12/2010 | Rohde et al. ................... | 717/154 |
| 2011/0185427 A1* | 7/2011 | Aciicmez et al. ............... | 726/24 |
| 2011/0321016 A1* | 12/2011 | Haviv et al. .................... | 717/128 |
| 2012/0023395 A1* | 1/2012 | Pieczul et al. ................. | 715/234 |
| 2012/0117644 A1* | 5/2012 | Soeder ............................ | 726/22 |
| 2012/0151592 A1* | 6/2012 | Veanes et al. ................... | 726/25 |
| 2012/0167209 A1* | 6/2012 | Molnar et al. ................... | 726/22 |
| 2012/0260344 A1* | 10/2012 | Maor et al. ..................... | 726/25 |

FOREIGN PATENT DOCUMENTS

WO WO-2007/025279 A2 3/2007

OTHER PUBLICATIONS

G. T. Buehrer, B. W. Weide, and P. A. G. Sivilotti, "Using Parse Tree Validation to Prevent SQL Injection Attacks", International Workshop on Software Engineering and Middleware (SEM), 2005.*
W. G. Halfond and A. Orso, "AMNESIA: Analysis and Monitoring for NEutralizing SQL-Injection Attacks", Proceedings of the IEEE and ACM International Conference on Automated Software Engineering (ASE 2005), Long Beach, Calif., USA, Nov. 2005.*

(Continued)

*Primary Examiner* — Jung Kim
*Assistant Examiner* — Theodore Parsons
(74) *Attorney, Agent, or Firm* — Harrington & Smith; Louis J. Percello

(57) ABSTRACT

A method is disclosed that includes tracking untrusted inputs through an executing program into a sink, the tracking including maintaining context of the sink as strings based on the untrusted inputs flow into the sink. The method also includes, while tracking, in response to a string based on an untrusted input being about to flow into the sink and a determination the string could lead to an attack if the string flows into a current context of the sink, endorsing the string using an endorser selected based at least on the current context of the sink, and providing the endorsed string to the sink. Computer program products and apparatus are also disclosed.

24 Claims, 6 Drawing Sheets

(56) References Cited

OTHER PUBLICATIONS

Halfond, W.G.J.; Orso, A.; Manolios, P.; , "WASP: Protecting Web Applications Using Positive Tainting and Syntax-Aware Evaluation," Software Engineering, IEEE Transactions on , vol. 34, No. 1, pp. 65-81, Jan.-Feb. 2008.*

V. Benjamin Livshits and Monica S. Lam. 2005. Finding security vulnerabilities in java applications with static analysis. In Proceedings of the 14th conference on USENIX Security Symposium—vol. 14 (SSYM'05), vol. 14. USENIX Association, Berkeley, CA, USA, 18-18.*

Martinelli, Fabio, et al., "Enhancing Java Security with History Based Access Control", LNCS 4677, 2007, 25 pgs.

Liu, Shi, et al., "A Novel Approach to Malicious Executables Detection and Containment Based on Distributed System Architecture", IEEE 2008, pp. 160-164.

Cheng, Ge, et al., "Building Dynamic Integrity Protection for Multiple Independent Authorities in Virtualization-based Infrastructure", IEEE 2009, pp. 113-119.

Zhang, Xiao-Song, et al., "A Practical Taint-Based Malware Detection", IEEE 2008, pp. 73-77.

Pistoia, et al., "A survey of static analysis methods for identifying security vulnerabilities in software systems", IBM Systems Journal, vol. 46, No. 2, 2007, pp. 265-288.

Arnold, Matthew, et al., "QVM: An Efficient Runtime for Detecting Defects in Deployed Systems", ACM 2008, 20 pgs.

Livshits, V. Benjamin, et al., "Finding Security Vulnerabilities in Java Applications", 16 pgs.

Tripp, Omer, et al., "TAJ: Effective Tain Analysis of Web Applications", ACM 2009, pgs. 11 pgs.

Minamide, Yasuhiko, "Static Approximation of Dynamically Generated Web Pages", ACM 2005, pp. 432-441.

Burdonov, Igor, et al., "Virtualization-based separation of privilege: working with sensitive data in untrusted environment", ACM 2009, pp. 1-6.

Abadi, Martin, et al., "Access Control based on Execution History", 15 pgs.

Salamat, Babak, "Multi-Variant Execution: Run-Time Defense against Malicious Code Injection Attacks", 2009, 112 pgs.

* cited by examiner

When reaching call site cs:

Check if cs is an HTML-modifying call.

If so, check what the HTML context is by consulting the HTML context mapping (e.g., pushdown automation).

Denote the context by c and the context-to-sanitizer map by C2S

For each input string, check whether the string may lead to an attack if the string flows into context c of the HTML.

If so, then first sanitize the string using C2S(c).

Optionally, log the attack attempt to make the attempt visible to the system administrators, etc.

Perfom the call at cs on the new set of arguments (where some were potentially sanitized).

FIG. 6

RUNTIME ENFORCEMENT OF SECURITY CHECKS

BACKGROUND

This invention relates generally to executing programs and, more specifically, relates to security checks for executing programs.

Ensuring that modern software systems are free of security vulnerabilities is a daunting, and oftentimes infeasible, task. Such systems mostly comprise millions of lines of code, including third-party and remote components. Moreover, the measures that need be taken to prevent potential attacks are, in most cases, far from being straightforward, as they depend on the state of the application, the exact content of the (potentially malicious) data being processed, and the use(s) the application is about to make of that data.

The problem is aggravated when it comes to Web applications, which—by design—feed on untrusted data, in the form user input. Web applications often access security-sensitive resources, such as a database, a file system, or a socket. In some cases, Web applications also mediate information between their users (e.g., in the case of a forum). The problem of securing Web applications against malicious attacks has therefore been the focus of intensive research during the last decade.

Traditionally, research on software security has concentrated on static-analysis techniques for the detection—rather than prevention—of security vulnerabilities. While being instrumental and insightful, this venue of research is currently limited, in that the state-of-the-art in static-analysis theory does not provide any compelling trade-off between precision and scalability assuming a sound report. This makes sound solutions based on static-analysis techniques impractical when it comes to modern software systems, since the analysis either does not scale or produces a tremendous number of false reports.

SUMMARY

In an exemplary embodiment, a method is disclosed that includes tracking untrusted inputs through an executing program into a sink, the tracking including maintaining context of the sink as strings based on the untrusted inputs flow into the sink. The method also includes, while tracking, in response to a string based on an untrusted input being about to flow into the sink and a determination the string could lead to an attack if the string flows into a current context of the sink, endorsing the string using an endorser selected based at least on the current context of the sink, and providing the endorsed string to the sink.

Computer program products and apparatus are also disclosed.

BRIEF DESCRIPTION OF THE SEVERAL VIEWS OF THE DRAWINGS

The foregoing and other aspects of embodiments of this invention are made more evident in the following Detailed Description of Exemplary Embodiments, when read in conjunction with the attached Drawing Figures, wherein:

FIG. 6 is an example of pseudo-code for the specific example of cross-site scripting on HTML objects.

DETAILED DESCRIPTION

A need still exists for enforcement of security checks, particularly for executing programs. Exemplary embodiments of the instant invention propose to address the challenge of securing programs, e.g., under a virtual-machine execution model, by using in an exemplary embodiment a specialized runtime environment (e.g., an instrumented runtime environment) that has the following characteristics: (1) An exemplary runtime environment is sensitive to the contextual information necessary to protect against improper execution of security-sensitive operations; and (2) the exemplary runtime environment is capable of interleaving appropriate endorsement steps (e.g., sanitization and/or validation steps) into the execution based on the collected contextual information, so as to ensure that security-sensitive operations are not abused.

Indeed, runtime environments of the kind the invention includes and modifies are already available. For example, in the case of Web applications written in JAVA (a programming language and computing platform), the Quality Virtual Machine (QVM) runtime environment developed at IBM Research can be customized to be used with embodiments of the instant invention.

Figure 1:
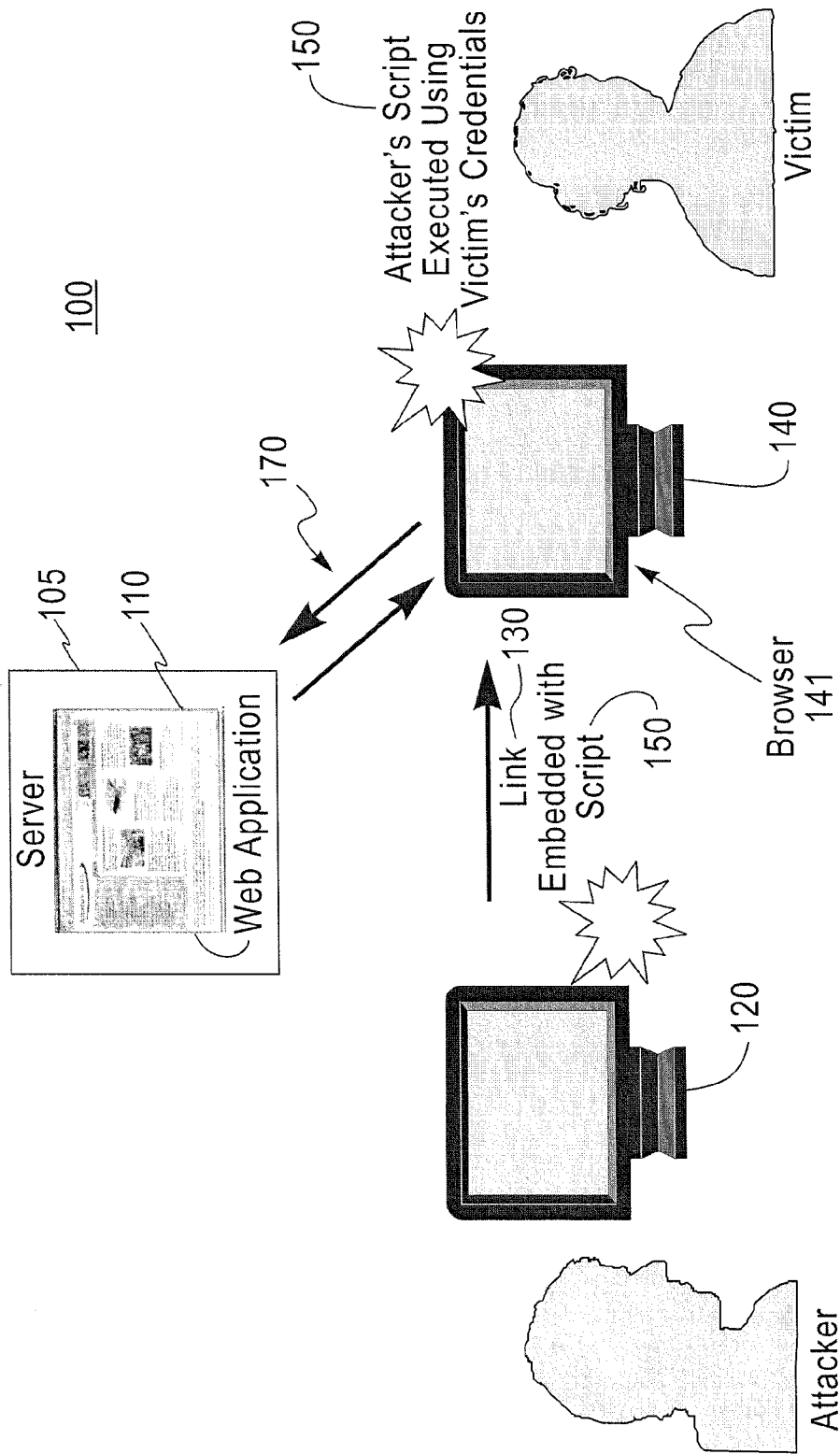
FIG. 1 is an example of a cross-site scripting (XSS) attack.

To illustrate certain aspects of the instant invention, it is helpful to explore exemplary embodiments in the context of a security vulnerability called cross-site scripting (XSS). XSS allows malicious Web users to inject code into Web pages viewed by other users. This vulnerability is the most important vulnerability in the space of Web applications comprising roughly 80 percent of all documented security breaches. It is also among the most difficult vulnerabilities to protect against (which might explain its prevalence). An example of XSS is shown in FIG. 1. In this system 100, a victim using computer 140 is logged into a web application 110 executing (usually virtually) on server 105. An attacker using computer 120 sends a link 130 with embedded script 150 to the victim, e.g., via electronic mail (email). The victim opens the email and clicks on the link 130 therein, which causes the script 150 to be sent to the web application 110 and reflected 170 back to the computer 140 (e.g., a browser 141 in the computer 140). This allows the attacker's script ISO to be executed using the victim's credentials because the script 150 was received by the browser 141 in computer 140 from a trusted source, the web application 110.

The XSS attack is one exemplary attack the instant invention could prevent, because the server 105, having an instrumented runtime environment in accordance with the instant invention, would interleave appropriate endorsement steps into the execution based on collected contextual information, e.g., of the HTML object sent in a response to the computer 140.

For instance, guarding against XSS attacks is done by escaping characters, that is, representing characters such that the character are treated as data, rather than metadata to be consumed by a parser of an interpreter (in web application 110). Escape rules for XSS are sensitive to the HTML context in which the untrusted input is to be embedded, and the rules distinguish between, e.g., the HTML body (e.g., div, b and td tags), typical attributes, JavaScript event handlers, and links.

Any static-analysis technique that has any type of scaling would not be able to reason about the HTML context in which untrusted data is consumed, with the result that the technique would be unable to verify whether untrusted inputs are endorsed properly prior to being inserted into the HTML response. Indeed, there does not appear to be any practical solution to this problem based on static-analysis techniques.

As for dynamic-analysis techniques, these are traditionally incomplete in terms of coverage, and cannot, therefore, provide strong guarantees regarding the security status of the tested application.

With exemplary instant approaches, it would be possible to track the HTML context in a precise manner by monitoring untrusted inputs and strings derived therefrom, as well as usage of the relevant HTTP objects, and maintain a state-machine representation of the HTML context (e.g., in the form of a pushdown automaton or discrete finite automaton). Then, when a string derived from an untrusted input is appended to the generated HTML, the system can decide whether and how to first endorse the string by escaping problematic characters based on the contextual information to which the system has access.

It is believed that for most (if not all) attack scenarios, context information can be represented in an efficient manner, which enables a correct and precise solution for the problem of securing software systems against potential attacks, This is a goal that has up until now laid outside the reach of automated solutions.

Figure 2:
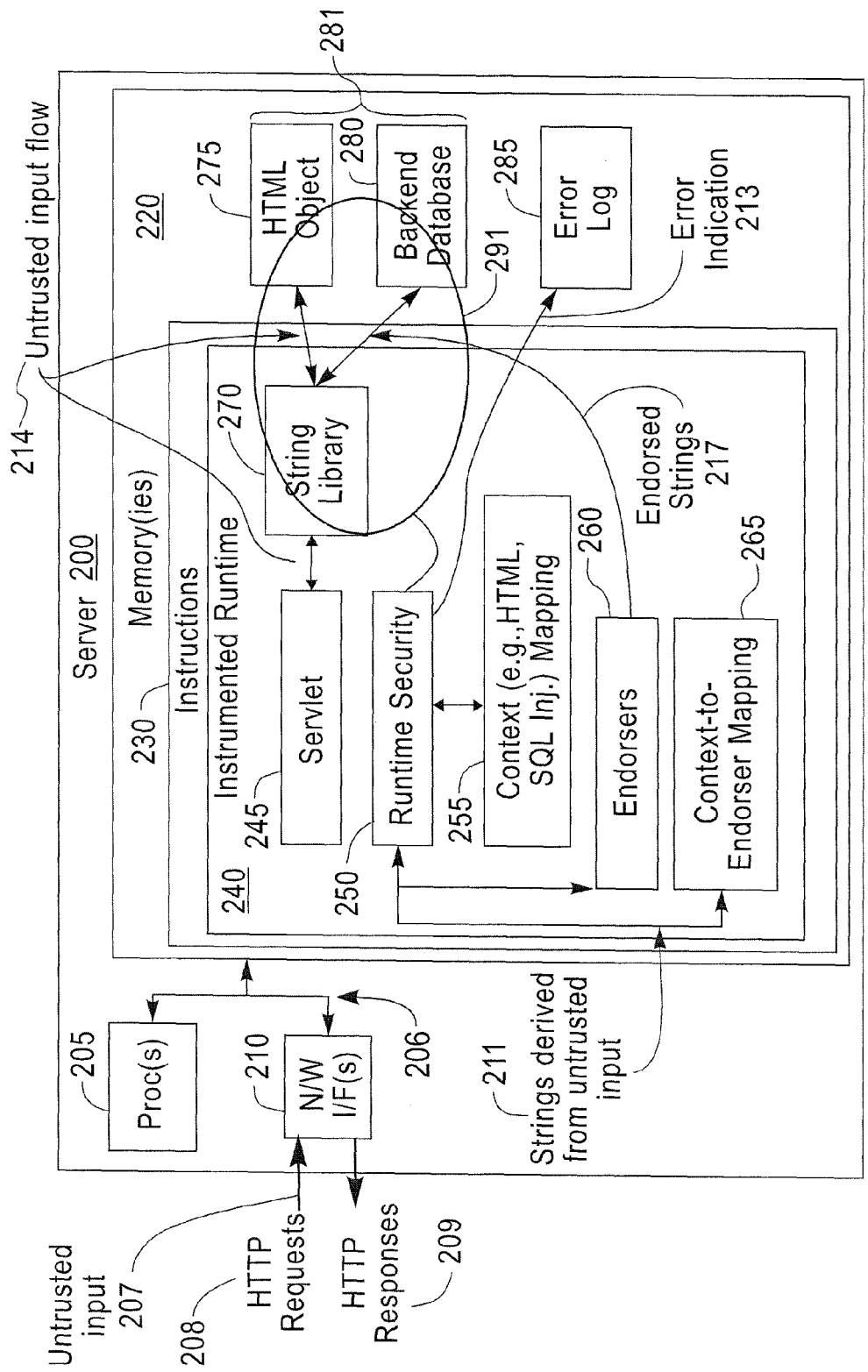
FIG. 2 is a block diagram of an exemplary apparatus suitable for use with the instant invention.

Turning to FIG. 2, a block diagram is shown of an exemplary apparatus (e.g., server 200) suitable for use with the instant invention. The server 200 includes one or more processors 205, one or more network (N/W) interfaces 210, and one or more memories 220, interconnected through one or more networks 206 (e.g., such as buses). The one or more memories 220 include instructions 230, an HTML (hypertext markup language object) 275, a backend database 280, and an error log 285. The instrumented runtime 240 includes a servlet 245, a string library 270, runtime security 250, context mapping 255, endorsers 260, and context-to-endorser mapping 265. The instructions 230, when executed by the one or more processors 205, cause the server 200 to carry out some or all of the various operations described herein.

The instrumented runtime 240 is a virtual machine that provides a virtual execution environment to executing programs. For instance, the servlet 245 is a software program that may be executed by the instrumented runtime 240, and the servlet 240 will receive HTTP requests 208 and respond to those requests using the HTTP responses 209. In normal program operation, the servlet 245 uses the HTTP requests 208 to access the string library 270 and to create and modify the HTML object 275. Typically, the servlet 245 appends to the HTML object 275, but any operation allowed to be performed on the HTML object is possible. In another example, the servlet 245 uses the HTTP requests 208 to access the string library 270 and to access the backend database 280.

It is noted that an instrumented runtime 240 is useful because the instrumented runtime 240 allows concrete semantics to be instrumented and also allows tracking of security-related aspects (e.g., of the HTML context) of the execution of the program (e.g., servlet 245). Instrumentation and tracking may also be accomplished via a security-aware compiler, which can interleave such aspects into the program when compiling the program. However, for simplicity, it is assumed herein that an instrumented runtime 240 is used.

The HTTP requests 208 typically will contain untrusted input 207, which may be used, e.g., for XSS when the servlet 245 accesses the HTML object 275 or, e.g., SQL (structured query language) injection when the servlet 245 accesses the backend database 280. This untrusted input 207 has a flow 214 into the servlet 245 and through the servlet 245 to a sink 281, of which HTML object 275 and backend database 280 are examples.

The instrumented runtime 240 in the case of Web applications written in JAVA is for instance the Quality Virtual Machine (QVM) runtime environment developed at IBM, which is customized to be used with the instant invention. The use of JAVA is merely exemplary and other virtual machines may be used. In an exemplary embodiment, the instrumented runtime 240 is modified to provide untrusted input flow 214 tracking by modifying the string library 270 so that components therein expose to the instrumented runtime 240 when strings have been modified and how. For the example of JAVA, the instrumented runtime 240 will execute each step of a program (e.g., servlet 245) and therefore can determine when strings have been modified.

The runtime security 250 is a program that provides runtime enforcement of security checks. Reference 291 illustrates where the runtime security 250 mainly operates. The runtime security 250 cooperates with the instrumented runtime 240 to track the untrusted input 207 through the servlet 245 and into a sink 281 (e.g., through the string library 270). While tracking the untrusted input flow 214, the runtime security 250 maintains context mapping 255, which is typically specific for the type of sink 281. That is, there generally would be one context mapping 255 for the HTML object 275 and a different context mapping 255 for the backend database 280.

As described in more detail below, during tracking of untrusted input flow 214, the runtime security 250 determines whether the flow 214 is about to enter a sink 281. If so, the runtime security 250 also determines for an input string (strings 211, which are derived from untrusted input 205, e.g., in the sense that they have generally been modified by the string library 270), whether the string may lead to an attack if the string flows into the current context (e.g., as determined by the context mapping 255) of the sink 281. If an attack is possible, the runtime security 250 accesses the context-to-endorser mapping 265 and determines an endorser 260 to use to endorse the string 211. The endorsed strings 217 are then passed to the appropriate sink 281. It should be noted that the endorsed strings 217 are shown passing from the endorsers 260 to the sink 281, but the endorsed strings 217 may also be passed back to the runtime security 250 and from the runtime security 250 to the sink 281.

Also shown is an error indication 213, which is placed in the error log 285 in response to, e.g., the runtime security 250 having to use an endorser 260. Alternatively, the error indication 213 is generated only if an endorser 260 indicates the endorser actually had to modify the string 211. As another example, the error indication 213 may be sent to a user, e.g., through the one or more network interfaces 210.

Figure 3:
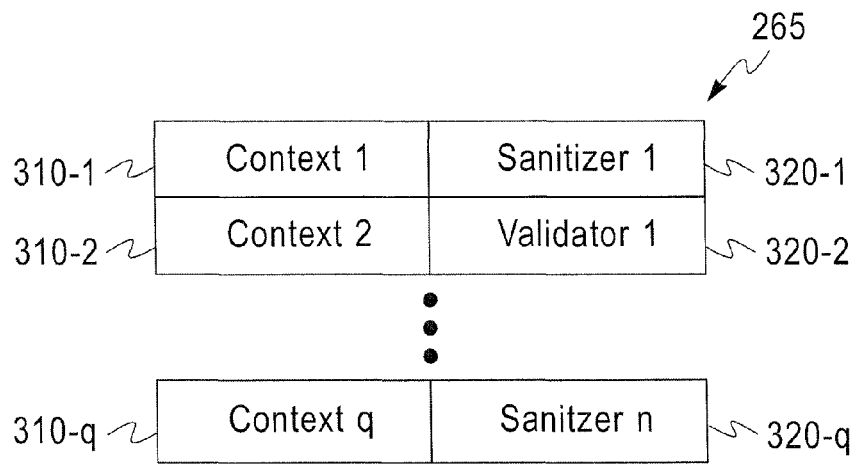
FIG. 3 is an example of a context-to-endorser mapping in accordance with an exemplary embodiment of the instant invention.

FIG. 3 is an example of a context-to-endorser mapping 265 in accordance with an exemplary embodiment of the instant invention. FIG. 3 shows contexts 310-1 through 310-$q$ and endorsers 320-1 thru 320-$q$. FIG. 3 illustrates that the context-to-endorser mapping 265 may include sanitizers (e.g., sanitizer 1 and sanitizer n) or validators (e.g., validator 1) as endorsers 320, based upon associated context 310. A sanitizer typically examines the content of the string 211 and replaces/removes substrings not suitable for the sink 281. With regard to validators, a validation routine does not modify its input. Instead, this routine has a Boolean return value, which indicates whether the input's format conforms to the constraints imposed by the security-sensitive sink.

Figure 4:
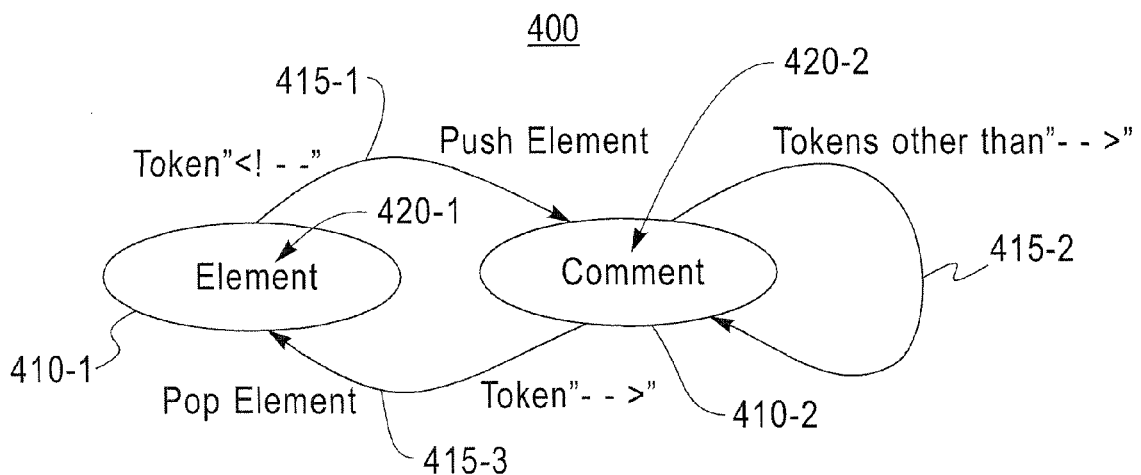
FIG. 4 is an illustration of a small snippet of an HTML (hypertext markup language) context mapping.

Turning to FIG. 4, an illustration is shown of a small snippet of an HTML (hypertext markup language) context mapping (e.g., context mapping 255). This example is illustrative of a pushdown automaton 400. As is known, pushdown automaton is equivalent to a context-free language. It should be noted that the pushdown automaton 400 is merely exemplary and other mapping may be used, such as a discrete finite automaton (DFA). However, a pushdown automaton enables a more accurate representation of HTML context than does a DFA. The pushdown automaton 400 has HTML contexts 420 as its states 410, has a stack alphabet (not shown), and an input alphabet that includes HTML keywords (e.g., "<!--" and "-->" for opening and closing an HTML comment). The states 410 therefore correspond to currently active HTML scope (e.g., comment, element, div) for the HTML object.

Assume that the automaton 400 has an empty stack, and is in state 410-1, ELEMENT (where ELEMENT is context 420-1 and corresponds to a portion of the HTML object 275). ELEMENT corresponds to the currently active HTML scope of the HTML fragment (e.g., HTML object). ELEMENT matches the part of the fragment extending from the point where the last element tag was opened, and up to the last character in the fragment. The automaton 400 observes token "<!--". Then the automaton pushes ELEMENT into its stack, and transitions to state 410-2, COMMENT (where COMMENT is context 420-2 and corresponds to another currently active HTML scope of the HTML object) via edge 415-1. As long as the automaton 400 observes tokens other than "-->", the automaton 400 remains in this state (and does not modify its stack). See edge 415-2. However, once token "-->" is observed, the automaton 400 pops state ELEMENT from the stack and transitions to state 410-1, context ELEMENT 420-1. See edge 415-3. That is, when the comment is closed, the HTML context is restored to what it was before the comment was opened.

As a more detailed example, the HTML object 275 is written by the servlet 240 processing the HTTP requests 208. While processing the requests 208, the servlet 240 incrementally builds the response HTML (the HTML object 275, which will be sent as HTTP response 209 once complete) by appending content to the HTML object 275. Once a given string 211 is appended to the response HTML in the HTML object 275, the string 211 has the potential of changing the HTML context. For example, assume that the response HTML in HTML object 275 (which is not yet a complete and valid HTML document, but is still in the making) is now in state 410-1 and context ELEMENT 420-1 (i.e., there is an open tag and then some attributes), and now a string starting with "<!---" (but not containing "-->") is appended. Then the HTML context 420 is now COMMENT 420-2. If, at this point, a tainted string 211 (which does not close the comment) is appended to the response HTML, then the tainted string 211 is benign, and the attack attempt can safely be ignored. Otherwise, the attack is likely to transform the structure of the response HTML. As is known, to write the response HTML, the "out" field of the HttpResponse object passed to the servlet 240 is typically used.

Although HTML is used herein as the primary example, the techniques herein are suitable for other sinks, too. For example, for SQLi (SQL injection), there is a different set of meta-characters relative to HTML, including "--" for comment. So if an attacker uses "; DROP TABLES" as the value of a user name, then this attack would only succeed if the attack is not in the COMMENT context. Additional examples for SQLi are described below.

Figure 5:
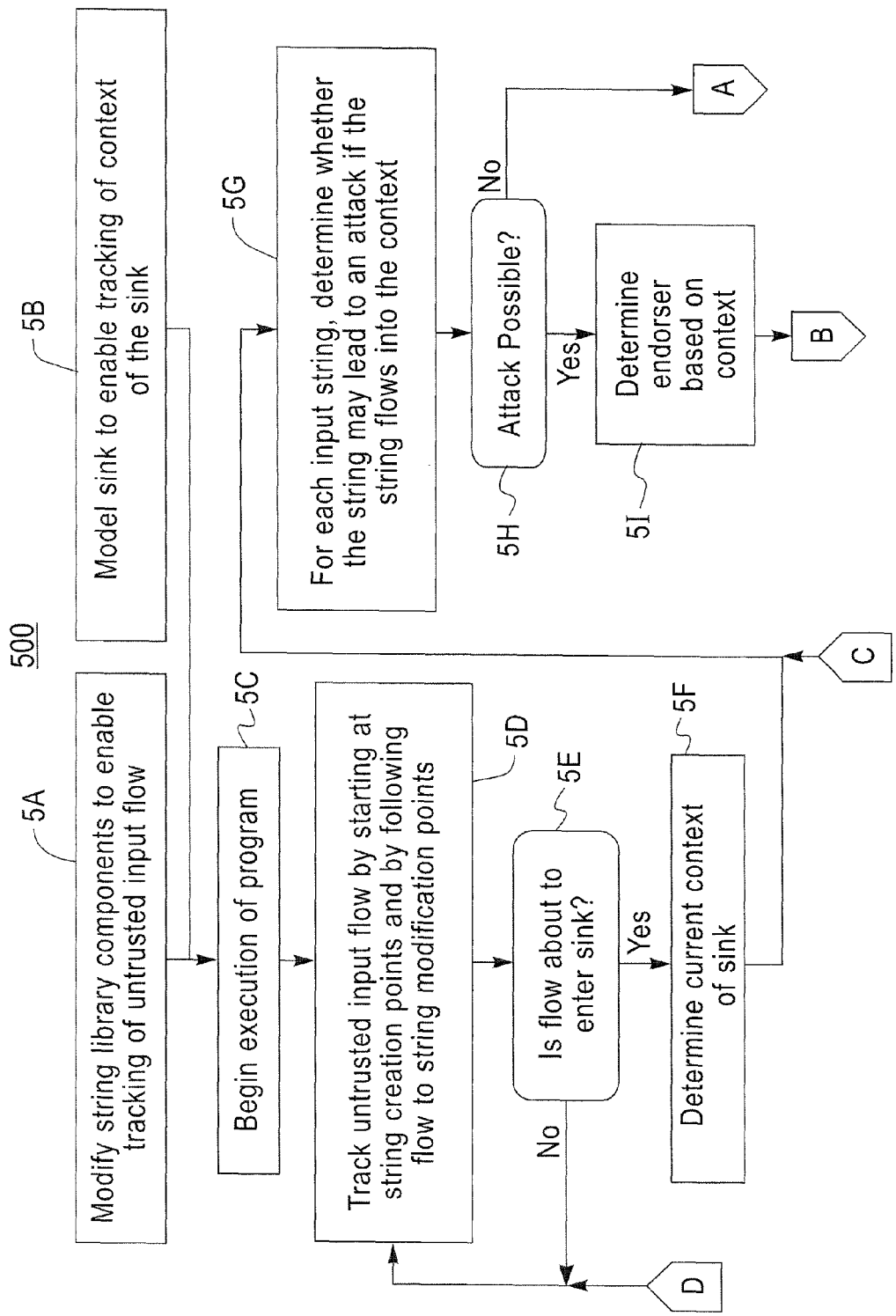
FIG. 5 is a flowchart of an exemplary method for runtime enforcement of security checks in a virtual execution environment.
Figure 5:
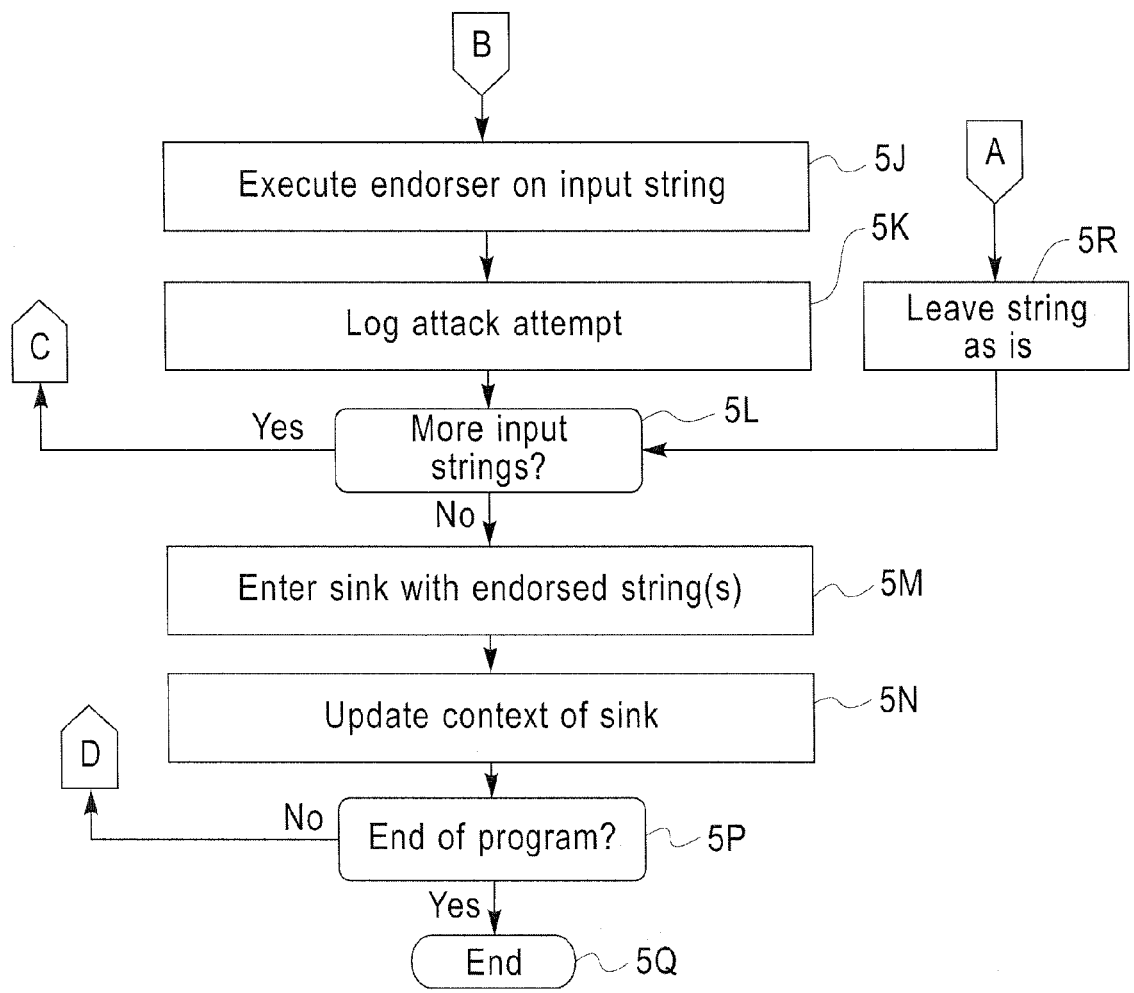

Turning now to FIG. 5, a flowchart is shown of an exemplary method 500 for runtime enforcement of security checks, e.g., in a virtual execution environment. Blocks 5A and 5B occur before execution (e.g., by instrumented runtime 240) of a program is performed. In this example, in block 5A, the string library 270 components are modified (if such modification is useful) to enable the tracking of untrusted input flow 214. In such a modification, the instrumented runtime 240 is modified to provide untrusted input flow 214 tracking by modifying the string library 270 so that elements therein expose to the instrumented runtime 240 when strings have been modified and how. For the example of JAVA, the instrumented runtime 240 will execute each step of a program (e.g., servlet 245) and therefore can determine when strings have been modified. In block 5B, the sink is modeled to enable tracking of context 310 of the sink. An example of a model for an HTML sink is shown in FIG. 4. The model (e.g., pushdown automaton 400) is used to enable the runtime security 250 thus maintains a current state of the HTML object 275 (in this example) by following paths through the pushdown automaton 400 based at least on strings being appended to the HTML object 275.

In block 5C, the program (e.g., servlet 245, although this is merely exemplary) is executed by the instrumented runtime 240. In block 5D, the runtime security 250 (e.g., in cooperation with the instrumented runtime 240) tracks untrusted input flow 214, e.g., by starting at string creation points (e.g., where untrusted input 207 enters the servlet 245) and following the flow 214 to string modification points. In block 5E, the runtime security 250 determines if the flow 214 is about to enter a sink 281. If not (block 5E=NO), the method 500 continues in block 5D). If so (block 5E=YES), in block 5F, the runtime security 250 determines the current context 310 (e.g., HTML context 420, though this is only exemplary and the context 310 is related to the sink 281) of the sink 281, such as through accessing the context mapping 255.

In block 5G, for each input string 211, the runtime security 250 determines whether the string 211 may lead to an attack if the string flows into the current context 310 of the sink 281. One accepted criterion for when an attack may arise is whether the operation will alter the intended structure (or more formally, the parse tree) of the resulting HTML. For example, if the application is expecting a plain string denoting the user's name, but instead gets a JavaScript piece of code, then appending the latter to the response HTML would result in a document that is not structurally equivalent to one where a plain user name is reflected.

If an attack is not possible (block 5H=NO), the method 500 continues in block 5R, where the string is not modified (i.e., left as is). The method 500 then continues in block 5L. If an attack is possible (block 5H=YES), the runtime security 250 determines an endorser 260 based on current context 310. Typically, the runtime security 250 accesses the context-to-endorser mapping 265 to determine the appropriate endorser 260, although other techniques are also possible.

In block 5J, the determined endorser 260 is executed on the input string 211. The endorser 260 creates endorsed string 217 from the input string 211. It is noted that the endorsed string 217 and the input string 211 may be the same. That is, the input string 211 may not need to be modified by the endorser. In block 5K, the runtime security 250 optionally logs the attack attempt, e.g., by placing error indication 213 in an error log 285. It is also noted that the runtime security 250 may also (in addition to or instead of logging) communicate an error indication 213 to a user. Such communication can take place via electronic mail for example or via a message presented on a display. In block 5L, the runtime security 250 determines if there are more input strings 211. If so (block 5L=YES), the method 500 continues in block 5G. If not (block 5L=NO), then the sink 281 is entered with the endorsed string(s) 217.

In block 5N, the context 310 of the sink is updated. In block 5P, the runtime security 250 determines if the end of the program has been reached. If so (block 5P=YES), the method 500 ends in block 5Q. If not (block 5P=YES), the method 500 continues in block 5D.

As another example related to SQL, assume the servlet 145 asks for a user name and password, then uses the SQL query String query="SELECT * FROM users WHERE name.='"+ userName+"'AND pwd='"+pwd+"'" in order to access an SQL database and determine if the user name and password is valid. In response to an input user name of "jsmith" and a password of "Demo 1234", the servlet 245 creates the query "SELECT * FROM users WHERE name='jsmith' AND pwd='Demo1234'". In order to create an injection flaw, an attacker could submit a user name "foo'; drop table custid;—" in a user name field of the login screen. This entry is used by a servlet 245 to create the following string: SELECT * FROM users WHERE name='foo';drop table custid;--' AND pwd=''. This string contains potentially valid SQL queries, which may be executed and cause unexpected actions to occur. This string also alters the intended structure of the resulting SQL query.

In terms of an SQL context mapping like that shown in FIG. 4 for HTML context mapping, this mapping could have states of "User Name", "Password", and "SQL User Lookup". Hitting the "Enter" key while in states of "User Name" or "Password" causes transition to the "SQL User Lookup" state. At the transition to the "SQL User Lookup", it is determined if an attack is possible (Block 5H of FIG. 5). If an attack is possible (block 5H=YES), the appropriate endorser would be determined in block SI based on the context, e.g., the state of "SQL User Lookup". The endorser would be executed on the input string in block 5J, and the attack would be logged in block 5K. If an attack is not possible (block 5H=NO), the string would be left as is (block 5R).

Referring now to FIG. 6, an example is shown of pseudo-code for the specific illustration of cross-site scripting on HTML objects. This is an illustration of how many of the blocks of FIG. 6 may be implemented as pseudo-code and then later as software core.

As should be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like and conventional procedural programming languages, such as the "C" programming language or assembly language or similar programming languages. Such computer program code may also include code for field-programmable gate arrays, such as VHDL (Very-high-speed integrated circuit Hardware Description Language).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

What is claimed is:

1. A method, comprising:
   tracking, using a computer system, untrusted inputs through an executing program into a sink that performs a security-sensitive operation using the inputs, the tracking including maintaining context of the sink as strings based on the untrusted inputs flow into the sink, wherein maintaining the context of the sink further comprises maintaining a context mapping comprising contexts of the sink and transitions between contexts, the transitions corresponding to string input at the contexts, and wherein there are a plurality of different context mappings based on a plurality of different types of sinks, wherein the tracking untrusted inputs is performed by an instrumented runtime previously modified to provide untrusted input flow tracking at least by modifications to a string library so that elements in the string library expose to the instrumented runtime when strings have been modified and how, and
   while tracking, in response to a string based on an untrusted input being about to flow into the sink and a determination the string could lead to an attack if the string flows into a current context of the sink, endorsing by the computer system the string using an endorser selected based at least on the current context of the sink, and providing the endorsed string to the sink, wherein the determination is made using a corresponding one of the context mappings for the type of the sink and wherein the selected endorser is one of a plurality of endorsers and is further selected based on the corresponding one of the context mappings for the type of sink, wherein the endorsing and providing are performed by the instrumented runtime at least by interleaving endorsement steps into execution of the program based on the context.

2. The method of claim 1, wherein there are a plurality of sinks and tracking and endorsing is performed for each of the plurality of sinks.

3. The method of claim 1, wherein there are a plurality of strings about to flow into the sink, wherein the method further comprises:
   for each of the plurality of strings:
      for a determination the string could lead to an attack if the string flows into the current context of the sink, endorsing the string using an endorser selected based at least on the current context of the sink; and
      for a determination the string could not lead to an attack if the string flows into the current context of the sink, leaving the string unmodified; and
   providing any endorsed strings and any non-endorsed strings to the sink.

4. The method of claim 1, wherein endorsing the string comprises sanitizing the string.

5. The method of claim 1, wherein endorsing the string comprises validating the string.

6. The method of claim 1, wherein maintaining the context mapping further comprises updating the current context from a first context to a second context based on string input at the current context.

7. The method of claim 1, wherein the sink comprises a hypertext markup language (HTML) object, and the context corresponds to a currently active HTML scope of the hypertext markup language object.

8. The method of claim 1, where an instrumented runtime performs the method while executing the program.

9. The method of claim 7, wherein the context mapping for the HTML object is maintained using a state-machine representation of HTML context.

10. The method of claim 9, wherein the context mapping for the HTML object is maintained using a pushdown automaton having contexts as states and transitions between states correspond to tokens forming hypertext markup language keywords.

11. The method of claim 8 where a compiler performs instrumenting of the program while compiling the program.

12. The method of claim 1, wherein the plurality of different types of sinks comprises a hypertext markup language object and a database, wherein at least one endorser corresponding to the hypertext markup language object provides endorsement for cross-site scripting, and wherein at least one endorser corresponding to the database provides endorsement for structured query language injection.

13. A computer program product, comprising:
   a non-transitory computer readable storage medium having computer readable program code embodied therewith, the computer readable program code comprising:
   code for tracking untrusted inputs through an executing program into a sink, the tracking including maintaining context of the sink as strings based on the untrusted inputs flow into the sink that performs a security-sensitive operation using the inputs, wherein maintaining the context of the sink further comprises maintaining a context mapping comprising contexts of the sink and transitions between contexts, the transitions corresponding to string input at the contexts, and wherein there are a plurality of different context mappings based on a plurality of different types of sinks, wherein the tracking untrusted inputs is performed by an instrumented runtime previously modified to provide untrusted input flow tracking at least by modifications to a string library so that elements in the string library expose to the instrumented runtime when strings have been modified and how, and code for while tracking, in response to a string based on an untrusted input being about to flow into the sink and a determination the string could lead to an attack if the string flows into a current context of the sink, endorsing the string using an endorser selected based at least on the current context of the sink, and providing the endorsed string to the sink, wherein the determination is made using a corresponding one of the context mappings for the type of the sink and wherein the selected endorser is one of a plurality of endorsers and is further selected based on the corresponding one of the context mappings for the type of sink, wherein the endorsing and providing are performed by the instrumented runtime at least by interleaving endorsement steps into execution of the program based on the context.

14. The computer program product of claim 13, wherein there are a plurality of strings about to flow into the sink, wherein the computer readable program code further comprises:

code, for each of the plurality of strings,
for a determination the string could lead to an attack if the string flows into the current context of the sink, endorsing the string using an endorser selected based at least on the current context of the sink; and
for a determination the string could not lead to an attack if the string flows into the current context of the sink, leaving the string unmodified;
providing any endorsed strings and any non-endorsed strings to the sink.

15. The computer program product of claim 13, wherein endorsing the string comprises sanitizing the string.

16. The computer program product of claim 13, wherein endorsing the string comprises validating the string.

17. The computer program product of claim 13, wherein maintaining the context mapping further comprises updating the current context from a first context to a second context based on string input at the current context.

18. The computer program product of claim 13, wherein the sink comprises a hypertext markup language object, and the context corresponds to a currently active HTML scope of the hypertext markup language object.

19. An apparatus, comprising:
at least one processor; and
at least one memory including instructions,
the at least one processor configured, in response to executing the instructions, to cause the apparatus to perform at least the following:
tracking untrusted inputs through an executing program into a sink, the tracking including maintaining context of the sink as strings based on the untrusted inputs flow into the sink that performs a security-sensitive operation using the inputs, wherein maintaining the context of the sink further comprises maintaining a context mapping comprising contexts of the sink and transitions between contexts, the transitions corresponding to string input at the contexts, and wherein there are a plurality of different context mappings based on a plurality of different types of sinks, wherein the tracking untrusted inputs is performed by an instrumented runtime previously modified to provide untrusted input flow tracking at least by modifications to a string library so that elements in the string library expose to the instrumented runtime when strings have been modified and how, and while tracking, in response to a string based on an untrusted input being about to flow into the sink and a determination the string could lead to an attack if the string flows into a current context of the sink, endorsing the string using an endorser selected based at least on the current context of the sink, and providing the endorsed string to the sink, wherein the determination is made using a corresponding one of the context mappings for the type of the sink and wherein the selected endorser is one of a plurality of endorsers and is further selected based on the corresponding one of the context mappings for the type of sink, wherein the endorsing and providing are performed by the instrumented runtime at least by interleaving endorsement steps into execution of the program based on the context.

20. The apparatus of claim 19, wherein there are a plurality of strings about to flow into the sink, wherein the at least one processor is further configured, in response to executing the instructions, to cause the apparatus to perform at least the following:

for each of the plurality of strings:
for a determination the string could lead to an attack if the string flows into the current context of the sink, endorsing the string using an endorser selected based at least on the current context of the sink; and
for a determination the string could not lead to an attack if the string flows into the current context of the sink, leaving the string unmodified;
providing any endorsed strings and any non-endorsed strings to the sink.

21. The apparatus of claim 19, wherein endorsing the string comprises sanitizing the string.

22. The apparatus of claim 19, wherein endorsing the string comprises validating the string.

23. The apparatus of claim 19, wherein maintaining the context mapping further comprises updating the current context from a first context to a second context based on string input at the current context.

24. The apparatus of claim 19, wherein the sink comprises a hypertext markup language object, and the context corresponds to a currently active HTML scope of the hypertext markup language object.

* * * * *